United States Patent [19]

Blaker

[11] Patent Number: 4,752,123

[45] Date of Patent: Jun. 21, 1988

[54] CONCENTRIC BIFOCAL CONTACT LENS WITH TWO DISTANCE POWER REGIONS

[75] Inventor: J. Warren Blaker, Bronx, N.Y.

[73] Assignee: University Optical Products Co., Fla.

[21] Appl. No.: 799,410

[22] Filed: Nov. 19, 1985

[51] Int. Cl.⁴ .............................................. G02C 7/04
[52] U.S. Cl. ..................................... 351/161; 351/177
[58] Field of Search ............... 351/160 R, 160 H, 161, 351/162, 177

[56] References Cited

U.S. PATENT DOCUMENTS

| | | | |
|---|---|---|---|
| 3,034,403 | 5/1962 | Neefe | 351/162 |
| 4,162,122 | 7/1979 | Cohen | 351/161 |
| 4,210,391 | 7/1980 | Cohen | 351/161 |
| 4,262,370 | 4/1981 | Hartstein | 623/6 |
| 4,466,705 | 8/1984 | Michelson | 350/418 |
| 4,573,775 | 3/1986 | Bayshore | 351/161 |
| 4,580,882 | 4/1986 | Nuchman et al. | 351/161 |
| 4,636,049 | 1/1987 | Blaker | 351/161 |
| 4,636,211 | 1/1987 | Nielsen et al. | 623/6 |
| 4,642,112 | 2/1987 | Freeman | 623/6 |

Primary Examiner—John K. Corbin
Assistant Examiner—Scott J. Sugarman
Attorney, Agent, or Firm—Martin Novack

[57] ABSTRACT

A concentric bifocal contact lens is disclosed. The lens has a first distance power correction region of circular periphery in the central portion thereof, surrounded in succession by a concentric near power correction annular region and a concentric second distance power correction annular region. Under bright conditions, when the pupil of the eye is small, the central distance power region is helpful in achieving good distance vision.

25 Claims, 1 Drawing Sheet

CONCENTRIC BIFOCAL CONTACT LENS WITH TWO DISTANCE POWER REGIONS

BACKGROUND OF THE INVENTION

This invention relates to contact lenses and, more particularly, to an improved bifocal corneal contact lens.

As people age, it is known that the accommodation faculties of the eye weaken and presbyopia occurs. Bifocal spectacles, which provide different correction powers for the upper and lower lens portions, have traditionally been used for patients with presbyopia.

The advent of small diameter corneal contact lenses has resulted in the widespread use of contact lenses. Most of these have been single vision types, although there have been a number of approaches tried to achieving an acceptable bifocal contact lens. One approach has been to produce a lens having a bottom portion which is either thicker or wider than the rest of the lens. In this type of lens, the object is to orient the near vision portion on the bottom, and the larger or heavier portion of the lens acts as "ballast" to achieve this. However, such construction of the lens has not proved to be satisfactory for a number of reasons.

Another type of bifocal contact lens is the so-called concentric or annular bifocal wherein the two correction regions are in the form of a circular central correction region and a surrounding concentric annular correction region. In one version of this lens, the central optical zone contains the correction for the patient's distance vision, and is called the distance power area. The surrounding concentric annular region contains the near vision correction, and is called the near power area. When the patient glances downwardly, he or she is able to look through the near power area for viewing near objects, regardless of the rotational orientation of the lens. There are substantial problems with this approach, however. In addition to having to glance downwardly to see close objects, the lens is problematic for low light conditions, such as night driving, wherein the pupil will become large, and a large fraction of the received light will pass through the near power area, thereby resulting in a large blur circle and concomitant navigational difficulties.

Another version of the concentric bifocal contact lens puts the near power region in the center, and surrounds it with a distance power annular region. For example, in the U.S. Pat. No. 3,726,587 there is disclosed a concentric bifocal contact lens wherein a central circular near viewing segment formed of one material is fused into an indentation in a lens body formed of another material. In this patent, the near viewing segment is indicated as having a diameter within a range of 0.1 to 0.3 mm. less than the near point pupil size of the eye under an active state of near accommodation.

In the book entitled "Contact Lens Practice" by Robert B. Mandell, published by Charles C. Thomas Co., there is disclosed another concentric bifocal contact lens having the near power area in the center and the distance power area in the surrounding annulus. In this reference, the near segment diameter is stated to be equal to the pupil size under bright illumination, or 0.1 mm. to 0.2 mm. smaller. Mandell also teaches that this lens should be fitted in a low position, so that when a patient looks at a distance he views primarily through the concentric distance portion, and when the gaze is directed from distance to near, the eye shifts down into the near power region.

It has been found that concentric bifocal contact lenses, with the near power area in the center of the lens, made consistent with the teachings of the above referenced prior art, tend to suffer significant disadvantages. These disadvantages result, inter alia, from the near power region being either too small or too large, which causes substantial problems under certain light and distance conditions. Also, the need for either segments of different material in the lens, or for having a lens which is fit low in the eye, can give rise to problems which would be unnecessary if an acceptable single-material symmetrically fit bifocal contact lens were available. In accordance with an embodiment as set forth in my copending U.S. patent application Ser. No. 534,017, now U.S. Pat. No. 4,636,049 and which has been made and sold by University Optical Products, Inc. of Largo, Fla., there is provided a thin circular lens body formed of a single piece of plastic material. The plastic material may be of the type used in making either so-called hard or soft contact lenses, the latter being adapted for hydration by a substantial quantity of water. The body has a symmetrically curved rear surface adapted to fit centrally on the corneal surface of the eye. The lens body has a near power correction region of circular periphery in the central portion thereof, surrounded by a concentric distance power annular correction region. In accordance with a feature of that disclosed lens, the near power central region has an area which is substantially equal to half the pupil area of the eye under average reading light conditions, defined as about 80 foot candles.

As stated, the lens of the referenced copending application is formed of a single material, and is designed for a central fit. Further, the selection of a near power central region having an area which is substantially equal to half the pupil area under average reading light conditions was found to result in very substantial advantage under important conditions such as night driving, without significantly compromising the near vision characteristics. Unlike prior lenses, wherein the near power region was either too large or too small for proper operation under some conditions, and/or wherein multiple material lenses or unusual fitting was required, that lens provided good operating characteristics over a wide range of conditions with a single material lens that is centrally fit.

In bright light, when the pupil is small, the relatively narrow cone through which light is received results in a good depth of field, so that distance vision impairment, due to viewing through the near power region, is not a substantial problem. In dim light, the pupil will be large and a major fraction of the light will be received through the annular distance power region, thereby resulting in good distance vision, such as for night driving. Applicant found that if the near power region is made larger than is taught in the abovereferenced copending application, the latter advantage will not attach, and, for example, night driving vision will be impaired by having too large a fraction of the light pass through the near power region. If the near power vision is made smaller than is taught in the abovereferenced copending application, the near vision characteristics will be compromised.

It is an object of the present invention to provide improvement over the lens described in the referenced copending application.

SUMMARY OF THE INVENTION

In accordance with a feature of the present invention, the concentric bifocal contact lens of the abovereferenced copending application is further improved by providing structure which enhances distance vision performance under bright light conditions.

In accordance with the invention, the lens body has a first distance power correction region of circular periphery in the central portion thereof, surrounded in succession by a concentric near power correction annular region and a concentric second distance power correction annular region. Preferably, the diameter of the first distance power correction region is in the range 0.5 mm to 1.5 mm. Also, preferably, the near power annular region again has an area which is substantially equal to half the pupil area of the eye under average reading light conditions.

The described lens has substantially the advantages of the lens as previously set forth (i.e., with the two concentric regions), but also with enhanced distance vision in bright light. Under bright conditions, when the pupil is small, the small central distance power region will be helpful in achieving good distance vision. This zone provides additional distance power correction and is small enough that its depth of field will be sufficient to merge the image therefrom with the image from the near vision correction region, without undue degradation of near vision.

Further features and advantages of the invention will become more readily apparent from the following detailed description when taken in conjunction with the accompanying drawings.

DESCRIPTION OF THE PREFERRED EMBODIMENT

Figure 1:
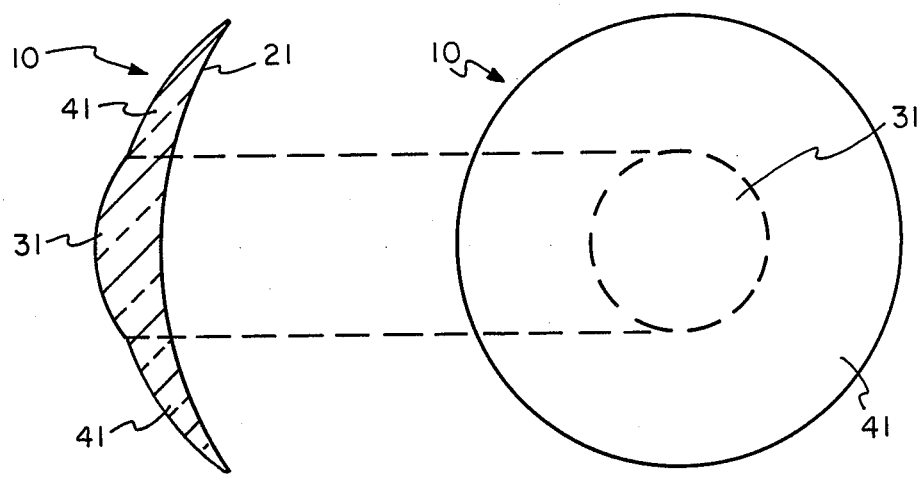
FIG. 1 shows a cross-section and a plan view of a bifocal corneal contact lens as set forth in my abovereferenced copending application.

Referring to FIG. 1, there is shown a diagram of a bifocal corneal contact lens as set forth in the abovereferenced copending application. A lens body 10 is formed of a single piece of plastic material, such as silicone acrylate. The rear surface 21 of the lens body, has a symmetrical curve, so that the lens can have a central fit on the corneal surface, and it is designed to be stable on the eye.

The lens body 10 has two distinct power regions formed by two different curves on the front surface thereof. A central region 31, of circular periphery, has a front surface curve which provides the near vision correction. Surrounding the central region is an annular region 41 having a different front surface curve which provides the distance vision correction. For illustration the curves are exaggerated in the Figure.

Figure 2:
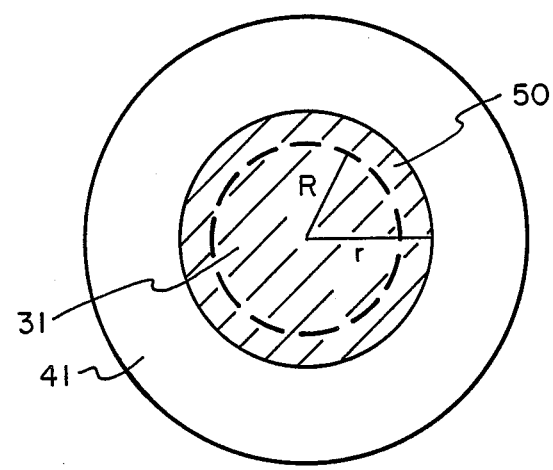
FIG. 2 shows the plan view of the FIG. 1 embodiment, superimposed over the pupil of a patient's eye.

FIG. 2 shows the lens of FIG. 1 superimposed over the pupil, 50, of a patient's eye. In FIG. 2 the pupil is assumed to be of the size it assumes in average reading light, i.e., about 80 foot candles. The area of the near power region 31 is selected to be substantially equal to half the pupillary area under the stated average reading light condition. If the pupil radius under the stated light condition is r (FIG. 2), then the radius R of the central near power region will be $R = r/\sqrt{2}$.

The selection of a near power region in this manner results in a very substantial advantage under important conditions such as night driving, without significantly compromising the near vision characteristics. Under the stated average reading light conditions, about half the light entering the pupil passes through the near power region, and about half through the distance power region, which is found to be quite satisfactory. In bright light, when the pupil is small, the relatively narrow cone through which light is received will result in a good depth of field, so that distance vision impairment, due to viewing through the near power region, will not be a substantial problem. In dim light, the pupil will be large and a major fraction of the light will be received through the annular distance power region, thereby resulting in good distance vision, such as for night driving.

An example of a pair of lenses as described in the abovereferenced parent application will now be set forth. The prescription was as follows:

|  | left eye | right eye |
| --- | --- | --- |
| keratometry | 41.12 × 42.50 | 41.50 × 42.37 |
| spec. refr. | −3.25 + 1.00 × 85° D | −2.75 + 0.75 × 100° D |
| near add | 1.50 D | 1.50 D |

The pupillary diameters in average reading light conditions (about 80 foot candles) was 3.0 mm. The lens specifications were as follows:

|  | left eye | right eye |
| --- | --- | --- |
| diameter | 8.7 mm | 8.7 mm |
| optical zone diam. | 7.0 mm | 7.0 mm |
| central thickness | 0.11 mm | 0.11 mm |
| base curve radius | 8.08 mm | 8.03 mm |
| power | −3.00 D | −3.00 D |
| near region diam. | 2.12 mm | 2.12 mm |
| near region add | 2.00 D | 2.00 D |

The lenses were formed from standard silicone acrylate buttons on automated lens cutting equipment of the type disclosed in U.S. Pat. Nos. 4,434,581 and 4,460,275. Alternatively, the lenses can be made using a compound radius turning lathe. For soft lenses, polyhydroxyl ethyl methacrylate may be used.

Figure 3:
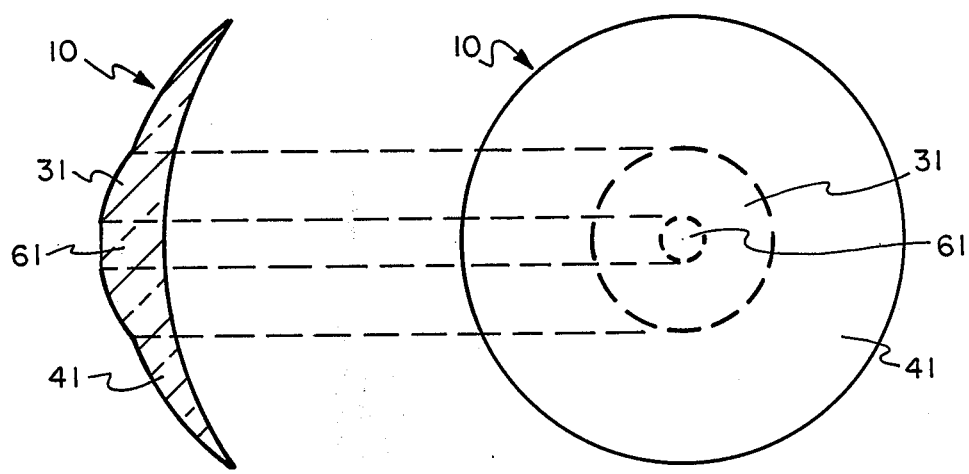
FIG. 3 shows a cross-section and a plan view of a bifocal corneal contact lens in accordance with an embodiment of the invention.

Referring to FIG. 3, there is shown an embodiment of the invention wherein the distance vision in bright light is enhanced by providing a small central distance vision circular region 61 in the center of region 31. Under bright conditions, when the pupil is small, the small distance region 61 will be helpful in achieving good distance vision by providing additional distance power correction. Also, the zone 61 is small enough that its depth of field will be sufficient to merge the image therefrom with the image from near vision correction region 31 without undue degradation of near vision. In this embodiment the area of near vision correction region 31 (which will now be an annulus) should again have an area which is substantially equal to half the pupil area of the eye under average reading light conditions. The central distance zone 61 preferably has a diameter in the range 0.5 to 1.5 mm.

An example of the dimensions for the FIG. 3 embodiment for a pupillary diameter in average reading light conditions is as follows:

central distance vision zone 61 diameter 1.00 mm
    near vision zone 31 outer diameter 2.35 mm
    outer diameter vision zone 41 outer diameter: 7.50 mm An example of a pair of lenses in accordance with the FIG. 3 embodiment of the invention will now be set forth. The prescription is again as follows:

|  | left eye | right eye |
| --- | --- | --- |
| keratometry | 41.12 × 42.50 | 41.50 × 42.37 |
| spec. refr. | −3.25 + 1.00 × 85° D | −2.75 + 0.75 × 100° D |
| near add | 1.50 D | 1.50 D |

The pupillary diameters in average reading light conditions (about 80 foot candles) were again 3.0 mm. The lens specifications are as follows:

|  | left eye | right eye |
| --- | --- | --- |
| diameter | 8.7 mm | 8.7 mm |
| optical zone diameter | 7.5 mm | 7.5 mm |
| central thickness | 0.11 mm | 0.11 mm |
| base curve radius | 8.08 mm | 8.03 mm |
| distance regions power | −3.00 D | −3.00 D |
| central distance zone diameter | 1.00 mm | 1.00 mm |
| near region diameter | 2.35 mm | 2.35 mm |
| near region add | 2.0 D | 2.0 D |

I claim:

1. A bifocal contact lens for the cornea of an eye, comprising:
   a lens body adapted to fit on the corneal surface of the eye;
   said body consisting of the following three regions: a first distance power correction region of circular periphery in the central portion thereof, surrounded in succession by a concentric near power correction annular region and a concentric second distance power correction annular region.

2. The lens as defined by claim 1, wherein the near power annular region has an area which is substantially equal to half the pupil area of the eye under average reading light conditions.

3. The lens as defined by claim 1, wherein the diameter of said first distance power correction region is in the range 0.5 mm to 1.5 mm.

4. The lens as defined by claim 2, wherein the diameter of said first distance power correction region is in the range 0.5 mm to 1.5 mm.

5. The lens as defined by claim 1, wherein said lens body has a symmetrically curved rear surface adapted to fit centrally on the corneal surface of the eye.

6. The lens as defined by claim 2, wherein said lens body has a symmetrically curved rear surface adapted to fit centrally on the corneal surface of the eye.

7. The lens as defined by claim 3, wherein said lens body has a symmetrically curved rear surface adapted to fit centrally on the corneal surface of the eye.

8. The lens as defined by claim 4, wherein said lens body has a symmetrically curved rear surface adapted to fit centrally on the corneal surface of the eye.

9. The lens as defined by claim 1, wherein said lens body is formed of a single piece of plastic material.

10. The lens as defined by claim 2, wherein said lens body is formed of a single piece of plastic material.

11. The lens as defined by claim 3, wherein said lens body is formed of a single piece of plastic material.

12. The lens as defined by claim 4, wherein said lens body is formed of a single piece of plastic material.

13. The lens as defined by claim 5, wherein said lens body is formed of a single piece of plastic material.

14. The lens as defined by claim 6, wherein said lens body is formed of a single piece of plastic material.

15. The lens as defined by claim 8, wherein said lens body is formed of a single piece of plastic material.

16. The lens as defined by claim 9, wherein said plastic material is silicone acrylate.

17. The lens as defined by claim 10, wherein said plastic material is silicone acrylate.

18. The lens as defined by claim 9, wherein said plastic material is polyhydroxyl ethyl methacrylate.

19. The lens as defined by claim 10, wherein said plastic material is polyhydroxyl ethyl methacrylate.

20. The lens as defined by claim 14, wherein said plastic material is polyhydroxyl ethyl methacrylate.

21. A bifocal lens, comprising a lens body for mounting in conjunction with an eye, said body consisting of the following three regions: a first distance power correction region of circular periphery in the central portion thereof, surrounded in succession by a concentric near power correction annular region and a concentric second distance power correction annular region.

22. The lens as defined in claim 21, wherein the near power annular region has an area which is substantially equal to half the pupil area of the eye under average reading light conditions.

23. The lens as defined in claim 21, wherein the diameter of said first distance power correction region is in the range 0.5 mm to 1.5 mm.

24. The lens as defined in claim 22, wherein the diameter of said first distance power correction region is in the range 0.5 mm to 1.5 mm.

25. The lens as defined in claim 21, wherein said lens body is formed of a single piece of plastic material.

* * * * *